US008606659B2

(12) United States Patent  (10) Patent No.: US 8,606,659 B2
Aggarwal et al.  (45) Date of Patent: *Dec. 10, 2013

(54) IDENTIFICATION OF DISCREPANCIES IN ACTUAL AND EXPECTED INVENTORIES IN COMPUTING ENVIRONMENT HAVING MULTIPLE PROVISIONING ORCHESTRATION SERVER POOL BOUNDARIES

(75) Inventors: Vijay Kumar Aggarwal, Austin, TX (US); Craig Lawton, Raleigh, NC (US); Christopher Andrew Peters, Round Rock, TX (US); Puthukode G. Ramachandran, Austin, TX (US); Lorin Evan Ullmann, Austin, TX (US); John Whitfield, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 994 days.

This patent is subject to a terminal disclaimer.

(21) Appl. No.: 12/341,261

(22) Filed: Dec. 22, 2008

(65) Prior Publication Data

US 2009/0099942 A1   Apr. 16, 2009

Related U.S. Application Data

(63) Continuation of application No. 11/016,235, filed on Dec. 17, 2004, now Pat. No. 7,499,865.

(51) Int. Cl.
*G06Q 10/00* (2012.01)

(52) U.S. Cl.
USPC ............................. 705/28; 705/1.1; 705/7.11

(58) Field of Classification Search
None
See application file for complete search history.

(56) References Cited

U.S. PATENT DOCUMENTS

| | | | |
|---|---|---|---|
| 5,535,375 A | 7/1996 | Eshel et al. | |
| 5,826,239 A | 10/1998 | Du et al. | |
| 6,064,950 A | 5/2000 | Lehtinen | |
| 6,178,522 B1 | 1/2001 | Zhou et al. | |
| 6,542,854 B2 | 4/2003 | Yang et al. | |
| 6,996,743 B2 | 2/2006 | Knapp, III | |
| 7,167,862 B2 | 1/2007 | Mullins | |
| 7,293,080 B1 | 11/2007 | Clemm et al. | |
| 7,315,826 B1* | 1/2008 | Guheen et al. | 705/7.29 |
| 7,370,233 B1 | 5/2008 | Sobel et al. | |
| 7,378,968 B2* | 5/2008 | Wang et al. | 340/572.4 |
| 7,409,519 B2 | 8/2008 | Coronado et al. | |
| 7,430,610 B2* | 9/2008 | Pace et al. | 709/233 |

(Continued)

FOREIGN PATENT DOCUMENTS

WO   WO 99/66401 A1   12/1999

OTHER PUBLICATIONS

USPTO, examination correspondence in related U.S. Appl. No. 11/060,606, filed Feb. 17, 2005.

(Continued)

*Primary Examiner* — Asfand Sheikh
(74) *Attorney, Agent, or Firm* — Robert H. Frantz; Jeffrey S. LaBaw

(57) ABSTRACT

A system for establishing and maintaining inventories of computing environment assets comprising one or more custom collector interfaces that detect movement of assets from one environment to another, and an inventory scanner which modifies inventories for each environment based on monitored asset movements. The present invention is of especial benefit to autonomic and on-demand computing architectures.

27 Claims, 7 Drawing Sheets

(56) References Cited

U.S. PATENT DOCUMENTS

| | | | |
|---|---|---|---|
| 7,624,034 B2 * | 11/2009 | Botham et al. | 705/7.11 |
| 7,734,476 B2 * | 6/2010 | Wildman et al. | 705/2 |
| 7,735,077 B2 * | 6/2010 | Laird | 717/170 |
| 2002/0194251 A1 | 12/2002 | Richter et al. | |
| 2003/0084159 A1 | 5/2003 | Blewett | |
| 2003/0172141 A1 | 9/2003 | Miller et al. | |
| 2003/0200294 A1 * | 10/2003 | Thorpe et al. | 709/223 |
| 2003/0233378 A1 | 12/2003 | Butler et al. | |
| 2004/0010429 A1 | 1/2004 | Vedula et al. | |
| 2004/0019878 A1 * | 1/2004 | Kotnur et al. | 717/120 |
| 2004/0022227 A1 * | 2/2004 | Lynch et al. | 370/338 |
| 2004/0143505 A1 * | 7/2004 | Kovach | 705/23 |
| 2004/0182086 A1 | 9/2004 | Chiang et al. | |
| 2004/0193969 A1 | 9/2004 | Nemoto et al. | |
| 2005/0010838 A1 | 1/2005 | Davies et al. | |
| 2005/0131982 A1 | 6/2005 | Yamasaki et al. | |
| 2005/0145688 A1 * | 7/2005 | Milenkovic et al. | 235/375 |
| 2005/0174934 A1 | 8/2005 | Kodialam et al. | |
| 2005/0273675 A1 | 12/2005 | Rao et al. | |
| 2006/0015781 A1 | 1/2006 | Rothman et al. | |
| 2007/0198609 A1 * | 8/2007 | Black et al. | 707/204 |
| 2011/0214010 A1 | 9/2011 | Aggarwal et al. | |

OTHER PUBLICATIONS

USPTO, examination correspondence in related U.S. Appl. No. 11/016,210.

USPTO, examination correspondence in related U.S. Appl. No. 12/013,705.

USPTO; recent examination correspondence mailed on May 4, 2010 in related U.S. Appl. No. 11/060,606, filed by Vijay Kumar Aggarwal on Feb. 17, 2005.

USPTO, notice of allowance mailed on Jul. 2, 2012 in related U.S. Appl. No. 13/105,552, filed May 11, 2011 by Vijay Kumar Aggarwal.

USPTO; Notice of Allowance dated Sep. 21, 2012 in related U.S. Appl. No. 13/105,583, filed May 11, 2011.

USPTO; Notice of Allowance in related U.S. Appl. No. 13/105,583, mailed on Jun. 21, 2012.

USPTO; Examination Correspondence from a Related U.S. Appl. No. 11/016,210, filed Dec. 17, 2004 by Vijay Kumar Aggarwal.

* cited by examiner

IDENTIFICATION OF DISCREPANCIES IN ACTUAL AND EXPECTED INVENTORIES IN COMPUTING ENVIRONMENT HAVING MULTIPLE PROVISIONING ORCHESTRATION SERVER POOL BOUNDARIES

This is a continuation application of U.S. patent application Ser. No. 11/016,235, filed on Dec. 17, 2004 now U.S. Pat. No. 7,499,865, but Vijay Kumar Aggarwal, which is currently under allowance.

BACKGROUND OF THE INVENTION

1. Field of the Invention

This invention relates to inventory management of highly configurable systems which may be relocated from one physical environment to another.

2. Background of the Invention

As business demand increases, the depth of technology improvements and its intelligence to handle multiple processes becomes highly desirable and crucial. In any enterprise operation, it is difficult to effectively manage the ever-fluctuating resources available, while maximizing the resource utilization.

In fact, Information Technology ("IT") costs can become very expensive when maintaining sufficient resources to meet peak requirements. Furthermore, user inputs are generally required to facilitate such processes, which incurs additional costs in both time and human resource demand.

To address these needs, many large vendors of enterprise computing systems, such as International Business Machines ("IBM"), Hewlett-Packard ("HP"), Microsoft Corporation, and Sun Microsystems ("Sun"), have begun to develop and deploy infrastructure technologies which are self-managing and self-healing. HP's self-managed computing architecture is referred to "Utility Computing" or "Utility Data Center", while Sun has dubbed their initiative "N1". IBM has applied terms such as "Autonomic Computing", "Grid Computing", and "On-Demand Computing" to their various architecture and research projects in this area. While each vendor has announced differences in their approaches and architectures, each shares the goal of providing large-scale computing systems which self-manage and self-heal to one degree or another.

For example, IBM's Autonomic Computing is a self-managing computing model which is patterned on the human body's autonomic nervous system, controlling a computing environment's application programs and platforms without user input, similar to the way a human's autonomic nervous system regulates certain body functions without conscious decisions.

Additionally, IBM has defined their On-Demand Computing technology as an enterprise whose business processes, integrated end-to-end across the company and with key partners, suppliers, and customers, can respond quickly to any customer demand, market opportunity, or external threat.

"Provisioning" is a term used to describe various aspects of managing computing environments, and which often implies different things to different parties. Throughout the present disclosure, we will use the term "provision" or "provisioning" to refer to a sequence of activities that need to happen in a specific order in order to realize a computing environment to meet specific needs and requirements. The activities have dependencies on previous activities, and typically include:

(a) selecting appropriately capable hardware for the requirements, including processor speed, memory, disk storage, etc.;
(b) installing operating system(s);
(c) remotely booting networks;
(d) configuring networks such as Virtual Private Networks (VPN) and storage environments like Storage Area Network (SAN) or Network Attached Storage (NAS); and
(e) deprovisioning resources that are no longer needed back into an available pool.

Operating environments in large data centers have become increasingly complex. These data centers usually require a long time to modify their environments, so most provision for the worst-case scenario, often configuring more hardware than is needed just in case a peak requirement is experienced. As a result, most hardware and software resources are underused, increasing the costs of the system considerably. Furthermore, the issue of surges beyond what has been provisioned remains unaddressed (e.g. peak demands above the anticipated peak load).

In fact, provisioning is typically a time and labor consuming process consisting of hundreds of distinct and complex steps, and requiring highly skilled system and network administrators. For example, server provisioning is the process of taking a server from "bare metal" to the state of running live business transactions. During this provisioning process, many problems may arise such as increases in resource expense and declines in level of performance, which in turn can lead to dissatisfied customers and unavailability in services.

Because these are predictable issues, automation can be employed to manage these problems. One objective of the various of self-managed computing systems being offered by the major vendor is to automate to an extent as great as possible these provisioning activities, and especially to allow for near real-time reactions to changes in system requirements and demands, with little or no human administrator intervention. For example, IBM's Tivoli™ Provisioning Manager ("TPM") Rapid Provisioning is a modular and flexible set of workflows and scripts for the IBM Tivoli Intelligent Orchestrator product. The workflows have been generalized and packaged for customization by customers seeking to accelerate their provisioning process. They can be used as a starting point for an organization in automating not only their server provisioning process, but also other IT processes.

Other products currently offered by the major vendors include HP's OpenView OS Manager using Radia which is a policy-based provisioning and ongoing automated management tool for a variety of operating systems, and Sun's N1 Grid Service Provisioning System automates to some degree the provisioning of applications.

Turning to FIG. 3, the typical IT environments for an organization are depicted. When a new application program or server configuration is created, most development is conducted in a Development Environment (31). This can include "standard" software packages, such as database programs, as well as custom software components, such as Java Beans, and their configurations to perform a specified set of business operations. Often, the hardware configurations employed during development are representative, but not identical, to the final hardware configuration which will be deployed during production. For example, the final production environment may call for 50 highly similar servers sharing a computing demand for an enterprise, but because they will each be configured with identical software, a smaller, representative environment of 10 servers may be used during development.

Once the code under development is complete, a copy or image of it is moved into a Test Environment (32), where it is preferably loaded onto a hardware environment which is an exact copy of the future production hardware environment. In this phase, any issues which did not arise during the development phase running on the representative environment should be exposed, reducing the chances of an unexpected problem (and possible loss of revenue) when the production systems are provisioned with the new code.

During testing in this environment, various scripts are initiated to verify usability and ensure requirements are met. These scripts are designed to simulate certain scenarios and conditions which are expected to occur in production, such as peak demand conditions, race conditions, contention conditions, and the like. If there are any problems found, patches and upgrades (35) are produced in the Development Environment (31) and moved into the Test Environment (32), and tests are performed until they are passed.

Once the code passes testing phase, it is released into the Production Environment (33) in a controlled fashion, where it can be used by its intended users. As the Test Environment (32) is intended to be an identical duplicate environment to the Production Environment, few problems should be experience except for problems which are unpredictable, or under conditions which were not anticipated. When problems in production do occur, corrective patches and upgrades (35) are again produced in the Production Environment (31), migrated to testing (32), and finally released into production (33).

Some enterprise management systems provide "synchronization verification" (34) which periodically ensures that no differences exists between resources in the Production Environment (33) and the Test Environment (34). Differences can "creep" into the Production Environment as some administrators may make changes directly to the hardware and/or software in the Production Environment without making corresponding changes in the Test Environment. This synchronization verification, however, can be intrusive to the operation of the system, as will be described in the following paragraphs.

Additionally, IBM's systems can produce backup images (36) of programs and data from the Production Environment, typically performed during low periods of demand as the backup operations can reduce functionality and performance during their processes. By capturing backups from the Production Environment, the chances of being able to accurately reproduce the enterprise functions in the case of a system recovery are increased.

After a Production Environment has been deployed for some time and has undergone a number of patches and upgrades, it becomes desirable to determine the inventory of the Production Systems, e.g. the processors and their speeds, the amounts of memory and disk space installed on each server, the types and revision levels of operating systems and application programs, etc. It is important to know clearly and accurately the inventory of each Production Environment as this information is needed to manage license costs, and to properly determine future upgrade and change paths.

There are a number of inventory scanning tools available, but they are often operating system, middleware or hardware specific. For example, a production environment may include 20 AIX-based servers, and 10 Windows NT-based servers. A first inventory tool may be available for determining the configuration of the AIX-based machines, but a second tool may be required to determine the configuration of the NT-based machines. As such, inventory scans are at least partially managed manually, and partially performed with a collection of specific tools and programs suited for the purpose. This produces unreliable accountability and offers a skewed representation of the production environment.

Inventory scanning in this manner is resource intensive and can overload a production environment. As a result, inventory scans often are not performed by companies in their production environment in many situations, because the resources that are required during inventory scans can adversely affect business-critical operations, such as consuming needed memory, network bandwidth, or requiring disabling crucial security measures.

An alternative to this method is to pre-scan a machine in a test environment in order to know what resources will be available in the production environment. Then, either copy the applications via Internet or physically move the machine into production environment once scanning is completed. All these methods are both time and labor intensive while offering inaccurate inventory representation.

Therefore, there exists a need in the art for a system and method which can more accurately determine the true inventory of a production environment without increased manual labor, and without impact to the performance of the production environment.

BRIEF DESCRIPTION OF DRAWINGS

The following detailed description when taken in conjunction with the figures presented herein provide a complete disclosure of the invention.

SUMMARY OF THE INVENTION

Figure 1:
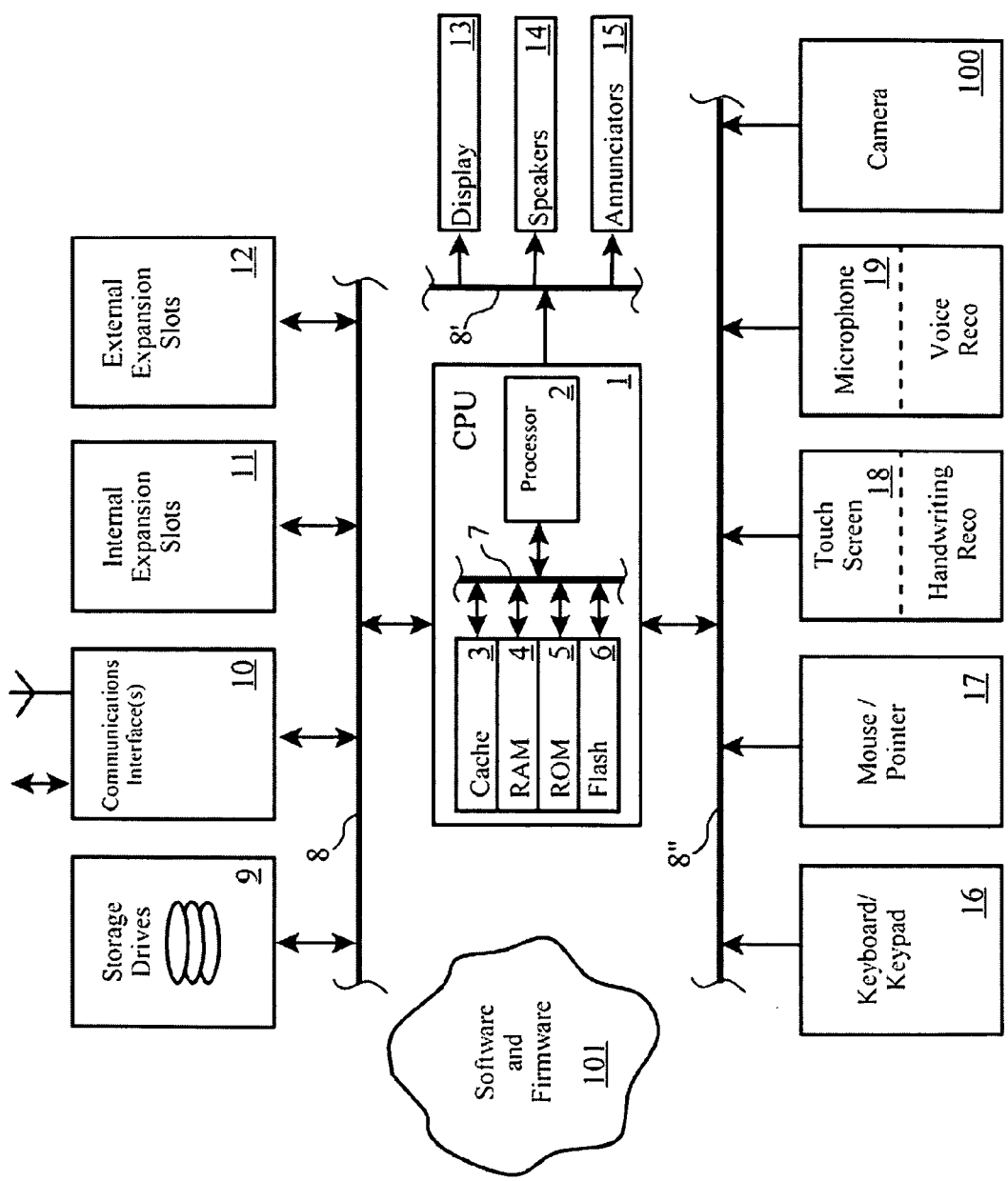
FIG. 1 depicts a generalized computing platform architecture, such as a personal computer, a server computer, a personal digital assistant, a web-enabled wireless telephone, or another processor-based device.

The present invention provides a non-invasive method to determine an inventory of computing assets in the three common customer environments: Development, Test and Production. The invention determines inventories of the various environments by noting when a new and previously unknown asset is introduced into an environment, and subsequently monitoring the transition of assets and components across boundaries of the environments, making necessary changes to the known inventory of each environment as asset movement is detected, and enforcing environment and configuration changes through proper channels and by properly authorized personnel.

Through use of the invention, human errors, IT costs, and resource overloads are reduced or even eliminated. Utilizing the On Demand provisioning concept along with the present invention assists organizations to better respond to changing business conditions on an as-needed basis, rather than following the traditional approach of "over specifying" needed resources in anticipation of peak demands. With the present invention, inventory scanning is conducted with minimal performance impact on the various environments, while providing realistic and accurate representation of its resources deployed in each environment.

DETAILED DESCRIPTION OF THE INVENTION

Because provisioning of computing environments is typically done manually, or using a rudimentary scripting language, it is both time and labor intensive, and prone to errors. Utilizing provisioning management systems such as those described in the foregoing paragraphs, especially those which provide real-time automated provisioning as system demands change, can alleviate some of the costs and risks of traditional provisioning, such that IT processes can be executed in a consistent, customized, and error-free manner without labor intensive processes that are prone to human errors. Servers, themselves, can be pooled to increase utilization, instead of over provisioning, which results in higher capital costs and lower utilization.

Even though the following disclosure utilizes certain IBM and non-IBM products for illustration and for preferred embodiments, it will be appreciated by those skilled in the art that the present invention is not limited to such applications and can equally well be realized in conjunction with a wide array of other products and services.

General Computing Platform

The invention is preferably realized as a feature or addition to the software already found present on well-known computing platforms such as personal computers, web servers, and web browsers. These common computing platforms can include personal computers and enterprise-class servers, as well potentially as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Turning to FIG. 1, a generalized architecture is presented including a central processing unit (1) ("CPU"), which is typically comprised of a microprocessor (2) associated with random access memory ("RAM") (4) and read-only memory ("ROM") (5). Often, the CPU (1) is also provided with cache memory (3) and programmable FlashROM (6). The interface (7) between the microprocessor (2) and the various types of CPU memory is often referred to as a "local bus", but also may be a more generic or industry standard bus.

Many computing platforms are also provided with one or more storage drives (9), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (10), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (12) allowing the user the ability to easily install and remove hardware expansion devices, such as PCMCIA cards, SmartMedia cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, the bus (8) may be of a proprietary design.

A computing platform is usually provided with one or more user input devices, such as a keyboard or a keypad (16), and mouse or pointer device (17), and/or a touch-screen display (18). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (18) is usually provided, often with handwriting recognition capabilities.

Additionally, a microphone (19), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (13), are also provided with most computing platforms. The display (13) may take many forms, including a Cathode Ray Tube ("CRT"), a Thin Flat Transistor ("TFT") array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, such as the speaker of a wireless telephone or the speakers of a personal computer. Annunciators (15) may take the form of simple beep emitters or buzzers, commonly found on certain devices such as PDAs and PIMs.

These user input and output devices may be directly interconnected (8', 8") to the CPU (1) via a proprietary bus structure and/or interfaces, or they may be interconnected through one or more industry open buses such as ISA, EISA, PCI, etc. The computing platform is also provided with one or more software and firmware (101) programs to implement the desired functionality of the computing platforms.

Figure 2:
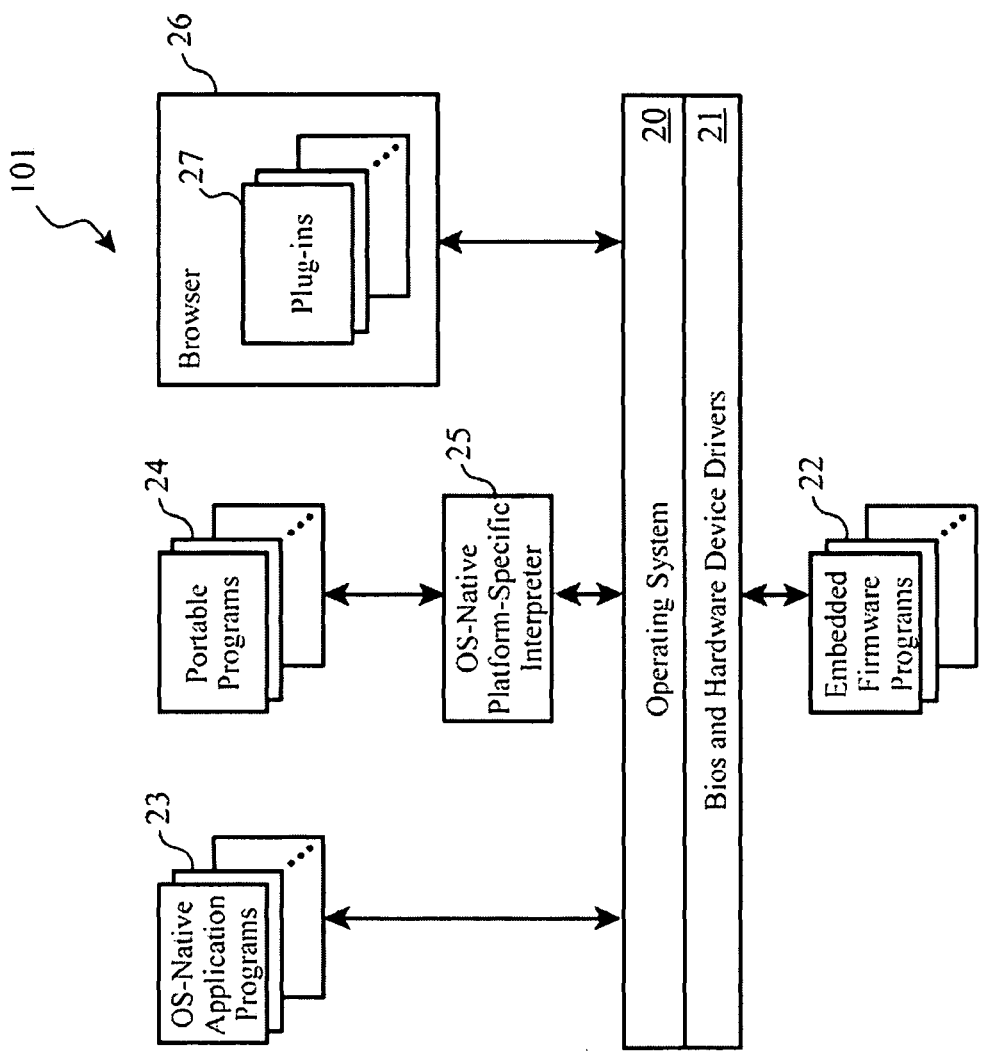
FIG. 2 shows a generalized organization of software and firmware associated with the generalized architecture of FIG. 1.
Figure 3:
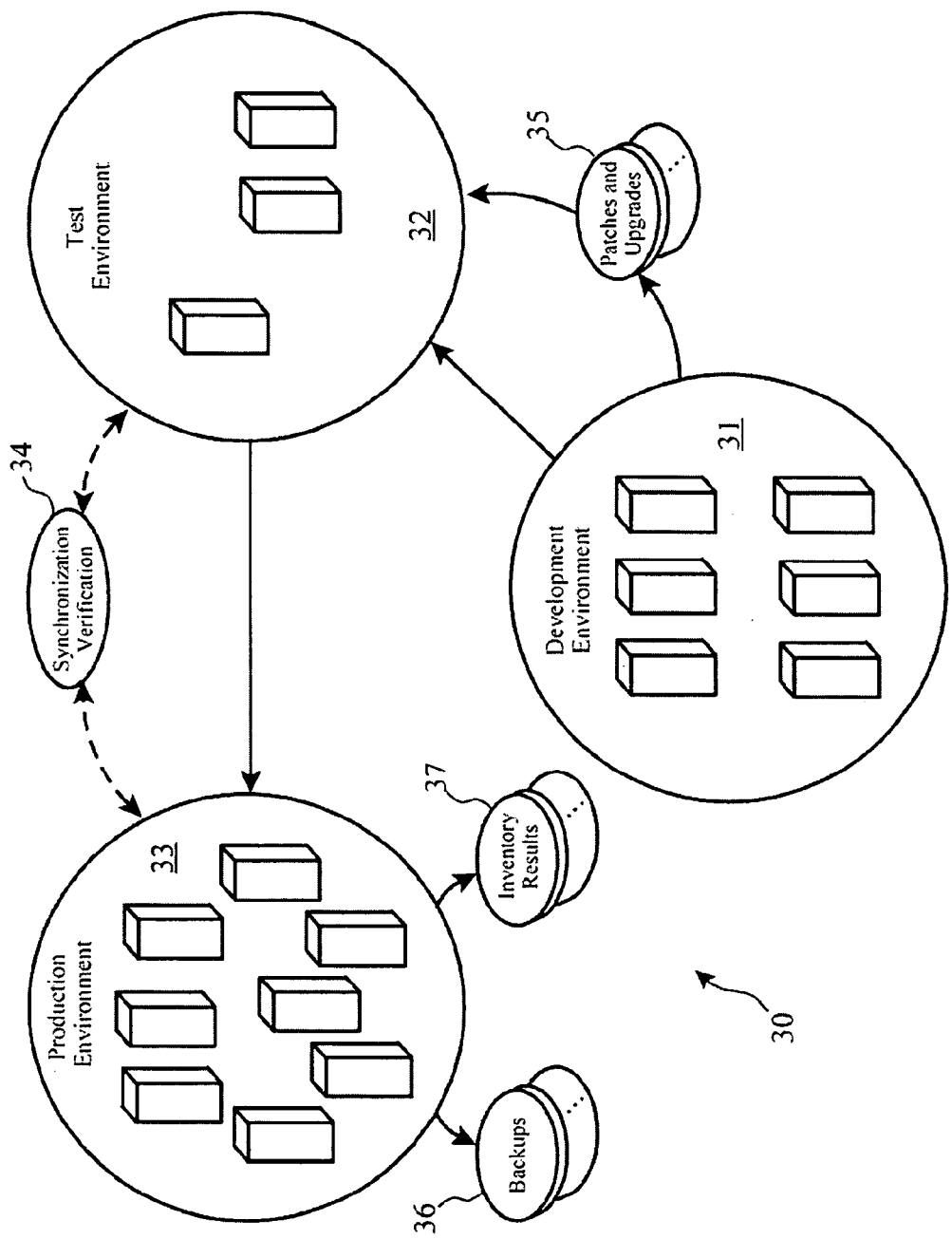
FIG. 3 illustrates a typical IT environment for an organization.

Turning to now FIG. 2, more detail is given of a generalized organization of software and firmware (101) on this range of computing platforms. One or more operating system ("OS")

native application programs (23) may be provided on the computing platform, such as word processors, spreadsheets, contact management utilities, address book, calendar, email client, presentation, financial and bookkeeping programs.

Additionally, one or more "portable" or device-independent programs (24) may be provided, which must be interpreted by an OS-native platform-specific interpreter (25), such as Java™ scripts and programs.

Often, computing platforms are also provided with a form of web browser or micro-browser (26), which may also include one or more extensions to the browser such as browser plug-ins (27).

The computing device is often provided with an operating system (20), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (21) are often provided to allow the operating system (20) and programs to interface to and control the specific hardware functions provided with the computing platform.

Additionally, one or more embedded firmware programs (22) are commonly provided with many computing platforms, which are executed by onboard or "embedded" microprocessors as part of the peripheral device, such as a micro controller or a hard drive, a communication processor, network interface card, or sound or graphics card.

As such, FIGS. 1 and 2 describe in a general sense the various hardware components, software and firmware programs of a wide variety of computing platforms, including but not limited to personal computers, servers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Cooperating Self-Managed Computing Components

The present invention may be used with or realized in conjunction with a wide variety of self-managed computing systems, modules, and components, including those previously described. Such a cooperating self-managed computing system enables data centers to move from worst-case provisioning, which provides enough resources to fulfill peaks in IT infrastructure demand, to just-in-time provisioning, which automates the infrastructure and executes configuration changes in a repeatable manner eliminating human errors.

As the present invention will be described in some example embodiments relative to implementation with and cooperation with a particular product line, it will be appreciated by those skilled in the art that the invention may equally well be realized with other self-managed computing system, modules, and components.

To help optimize performance, the provisioning process is often broken up based on desired target states of servers. A pool representing "bare metal" servers can exist along with other pools to represent servers in states which are more advanced but not fully complete. Each pool can serve one or more tiers of applications.

Because of dynamic changes in resources demands, it is often challenging to keep track of available production resources and their status using manual inventory scanning. In fact, current inventory methods are time and resource intensive, and increases risks of excessive loads being placed on resources in the production environment.

Inventory Scanner Module

A first portion of the present invention is known as the Inventory Scanner Module ("ISM"). ISM's primary function is to monitor the movement of resources between different environments rather than estimate the type of resources each environment possess. Each time a previously unknown resource such as a server platform or application program (or application program license) is introduced into any environment, the inventory is updated to reflect the addition of that new resource. Then, as that resource is moved from one environment to another, such as from development to test and then from test to production, inventories of each environment are appropriately updated. The present invention not only can track the assets and where they are, but it can also assist in detecting "missing" assets which should be in a certain environment and configuration such as missing patches or upgrades, which in their absence may result in security vulnerabilities or functionality problems.

By monitoring movements across environmental boundaries, accurate inventories of each environment are maintained by ISM without the need for intrusive measures. Rules regarding who can move assets from the truck to the warehouse, from the warehouse to the showroom, and from the showroom to the customer's possession are established by technologies (e.g. barcode scanners, anti-theft devices, etc.), and policies (e.g. personnel authorization, theft laws, etc.).

The present invention divides computing systems into multiple logical environments, enforces movement and transition policies and technologies, and tracks inventories by monitoring assets movements from one environment to another.

Figure 4:
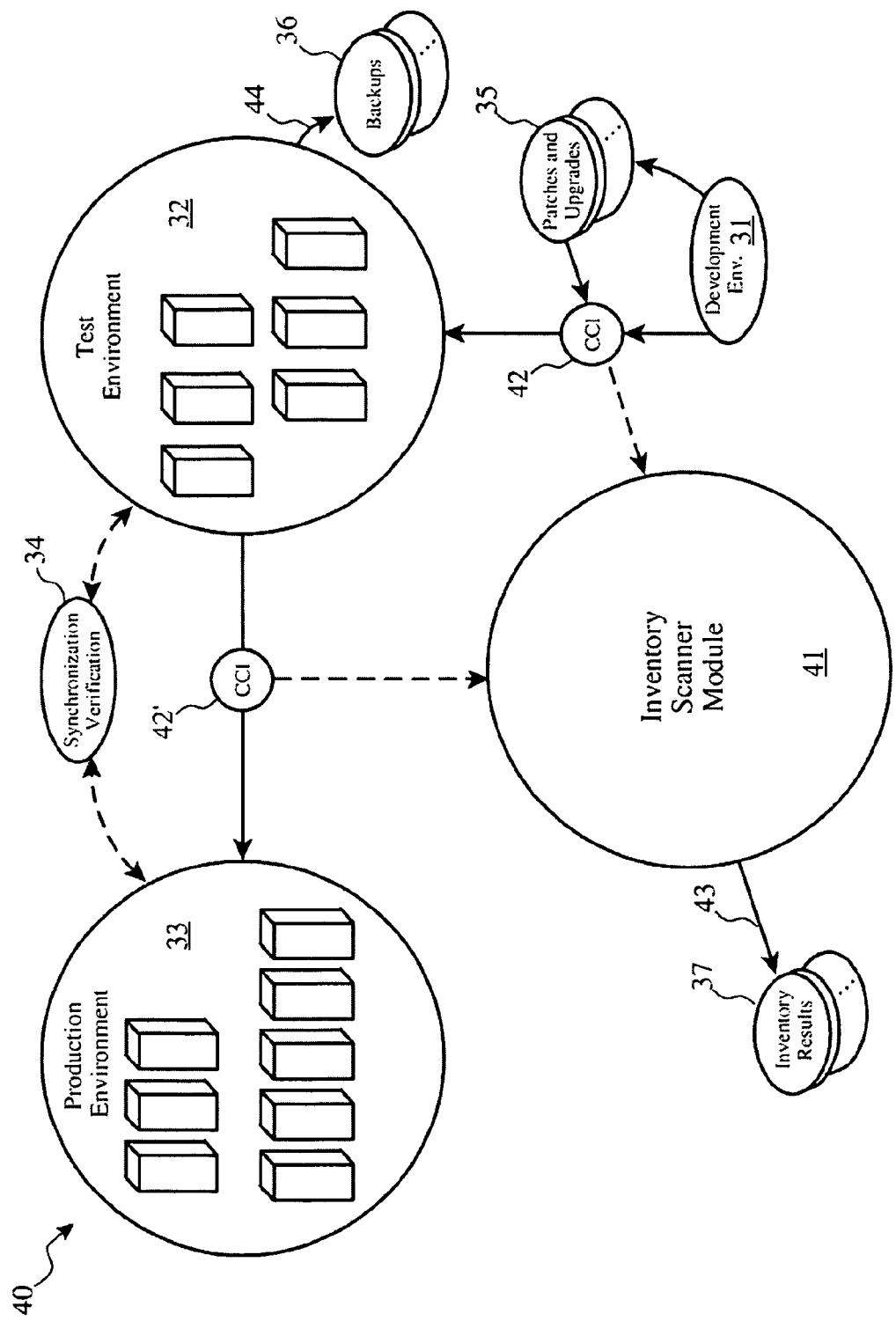
FIG. 4 shows the present invention is employed to benefit On-demand resource management.

Turning to FIG. 4, the diagram illustrates how ISM benefits self-managed resource management (40). New software code and applications are developed in the Development Environment (31), as are any subsequent code patches and upgrades (35).

However, rather than allowing "free" or unrestrained movement of new code, assets, patches and upgrades from Development (31) to the Test Environment (32), a Custom Collector Interface ("CCI") (42) is placed between the environments such that it can monitor and collect data regarding assets as the move between Production (31) and Test (32). This monitoring data is then provided to the ISM module (41), which updates (43) inventories (37) of each environment appropriately.

Each CCI module may be realized using any suitable programming methodology and language in consideration of each environment in which it will be executed, including consideration such as operating system, hardware platform, communications protocols to be implemented, etc.

New assets, patches and upgrades are verified in the Test Environment (32) per the traditional methods, without interference or intrusion by any scanning operations of the CCI or ISM. Once tests are completed, a backup (36) of the data and images of resources can be produced (44) normally, followed by moving the tested assets into a Production Environment (33). According to the invention, however, these assets are not freely moved from the Test Environment (32) to the Production Environment (33), but instead are moved in a manner which is monitored by a CCI (42'), which may be the same CCI (42) or a different CCI. In some scenarios, multiple instances of or variations of CCI functions may be employed to be compatible with hardware and software (e.g. operating system or middleware) requirements. The CCI (42') reports the movement of the assets from Test (32) to Production (33) to the ISM (41), which updates (43) the inventories (37) appropriately. Synchronization verification (34) can be performed normally, as previously described if desired.

It is also important to note that movements of assets between environments of like-type can equally well be monitored, such as moving an application program from one development environment to another development environment, or from one test environment to another test environment, by placing a CCI between each of these environments. There is no restriction on the CCI as to what types of environments it monitors, and especially whether or not the movement is across like-types or differing-types of environments. However, for ease of understanding, the remainder of this disclosure will focus on movements of assets between differing-types of environments, but it will be readily apparent to those skilled in the art that the present invention may be used to monitor inventory movements among like-types of environments, too.

Information collected via one or more CCI (42) is continuously collected by the ISM module (41). The ISM module conducts inventory management by updating inventories for each environment (37), preferably but not necessarily implemented in the form of a database. The ISM module (41) may be realized as a centralized program or service, or may be divided into multiple, distributed components which cooperatively achieve the same functionality.

Using this architecture and arrangement of components, including the CCI and the ISM components of the invention, allows ISM module to monitor movement of resources from the outside of each environment unintrusively, rather than from within each environment, which can cause considerable reduction of performance during inventory scanning.

In fact, using the cooperating self-management provisioning tool's capabilities along with ISM module as provided in the preferred embodiment, an expected "production environment" can be created. Using the provisioning workflows, it can scan a server as it is being developed in the test environment, and then deploy it based on data obtained from another environment. Verification of new software appearances or disappearances based on expected inventory in the last appearance of the solution server in a particular environment facilitates management and tracks inventory.

Figure 6:
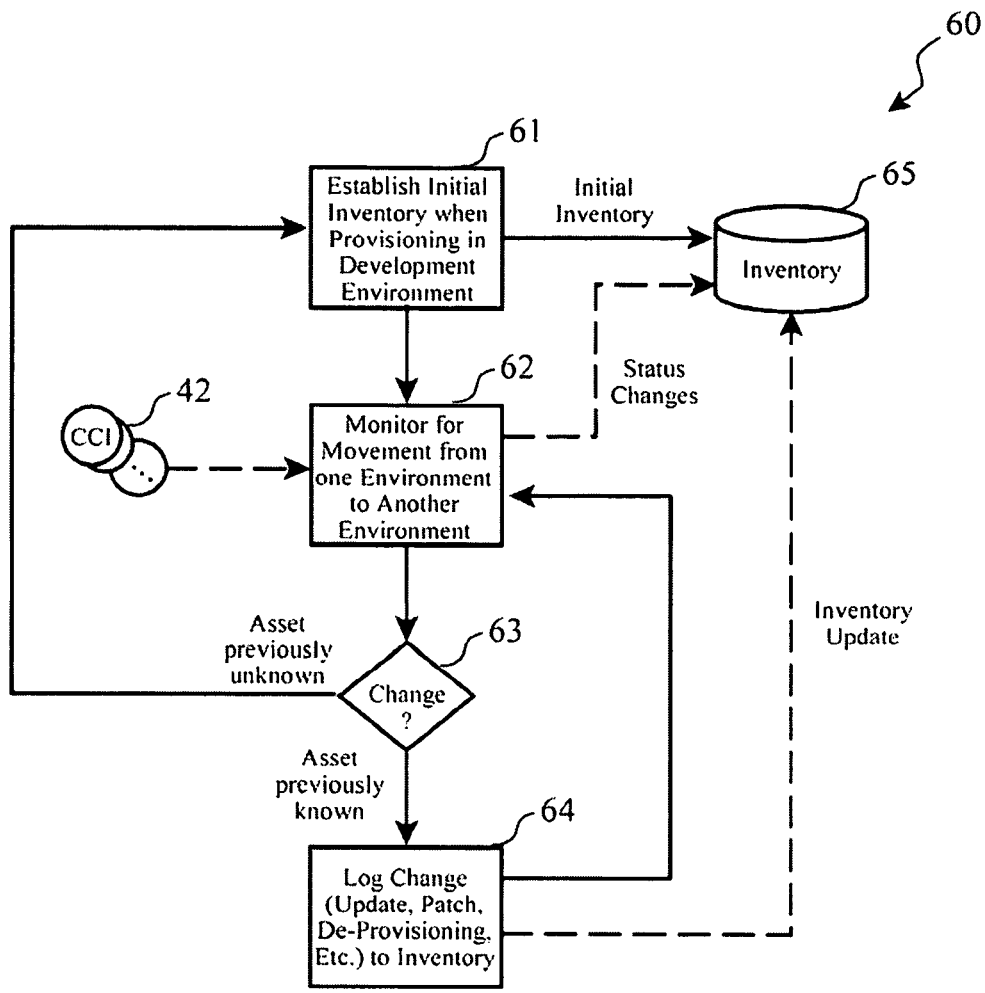
FIG. 6 sets forth details of one available embodiment of the logical processes of the present invention.

Turning to FIG. 6, details of the logical process of the ISM module are shown (60). The module establishes (61) an initial inventory of each environment, such as during provisioning in the Development Environment. The baseline inventory data is stored in an inventory (65). The ISM module continuously monitors (62) for any movements of assets between environments, as reported by the CCI modules (65), such as movements from a Development Environment into a Test Environment, or from a Test Environment to a Production Environment, as previously described.

All asset movements (63) are reflected in modifications (64) to the inventories (65) of the related or affected environments. If the moved asset is previously known to exist in an environment, the losing and receiving environment inventories are updated (64) to reflect the movement. If the moved asset is previously unknown (e.g. it is a new asset being added to an environment), new inventory entry for that asset is created (61). In another situation, an asset may be removed from an environment but not moved to another environment, such as a failed, obsolete or otherwise unnecessary asset. In such a case, the losing environment's inventory would be updated, but no receiving environment inventory would be modified.

While there are no asset movements currently being reported by the CCI, monitoring continues (62) awaiting a CCI report. According to one aspect of the present invention, all assets are monitored and tracked equally, including hardware, hardware platform upgrades, software applications, scripts, software licenses, patches, and software upgrades. The invention may be realized in alternate embodiments without monitoring each or all of these types of assets while some benefit of the invention can still be achieved. For example, in some situations, software assets may be likely to change environment more often than hardware assets, so monitoring periods may be adjusted by classes of assets to reflect their expected volatility or rate of change and movement.

Figure 7:
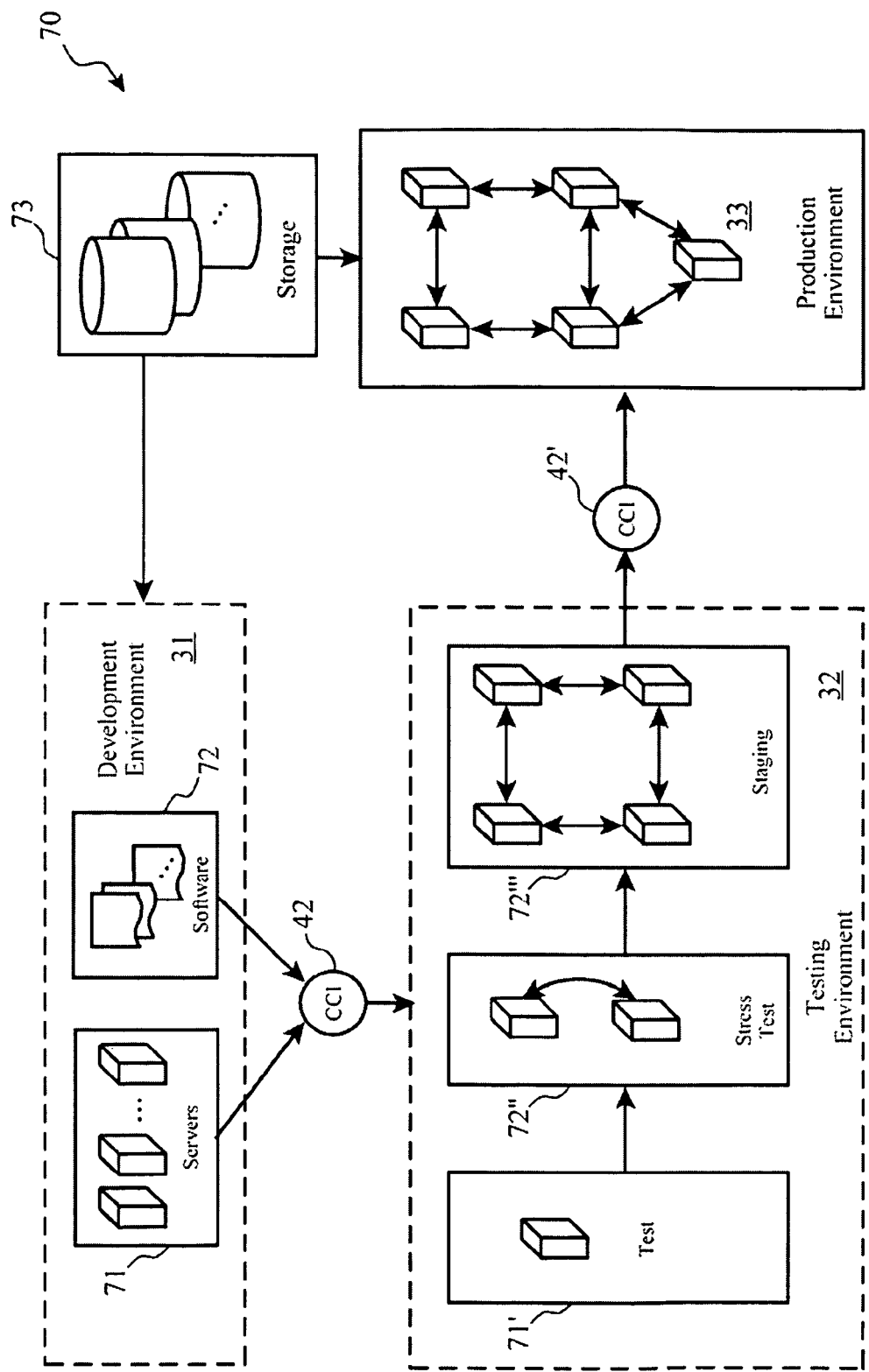
FIG. 7 provides more details of workflows which employ the new ISM and CCI modules of the present invention.

FIG. 7 provides more details (70) of workflows which employ the new ISM and CCI modules. Resource pools of storage (73) are typically made available to the Development (31), Test (32), and Production (33) Environments. Within Development (31), there are usually various types of applications and scripts (72) being created to run on different servers (71) to achieve certain business functions and operations. At this point, an initial inventory is created to establish a baseline status, as previously described.

When an authorized user or configuration tool initiates a movement of an asset from Production (31) to Testing (32), a CCI (42) module monitors and reports the movement, which results in updating of the Production and Testing inventories, as previously described.

Components are tested within Testing Environment (32), such as individual module or server testing (71'), stress scenario testing (72''), and staging (72''') of networked systems to simulate the final production configuration.

Stress testing allows measurement and prediction of the behavior and performance of an application on a global scale by simulating a large number of users and test case scenarios. Once completed, the application is moved into the staging environment (72'''), which normally is a mirror image of production environment.

If any patches or upgrades are created in Development (31) as the result of testing, those patches and upgrades are moved from Production (31) to Testing (32) under the monitor of the CCI (42), which causes the inventories to be updated appropriately.

When the solution is released into the Production Environment (33), a CCI (42') monitors the asset movement again, and inventory changes are made appropriately. In this manner, accurate inventories, established during Development Environment provisioning, are maintained through non-intrusive monitoring of assets from one environment to another.

Embodiment Enhancements and Optional Functions

According to other aspects of the preferred embodiment, boundaries between environments and movement of assets between environments are enforced through a combination of other technologies and policies. For example, a security policy enforcement tool such as Tivoli's Security Compliance Manager, Computer Associates International's eTrust™, or PentaSafe Security Technologies' VigilEnt Policy Center™, businesses establish, enforce, and monitor compliance with security and authorization policies. Such policies can be extended to define when and by whom an asset can be moved from one environment to another environment, such as through the definition of cluster-level security policies. Many such tools and systems can also detect when a policy has been violated, to assist in correcting the policy deficiency and to update inventories appropriately.

Additionally, well-known technologies which limit system access over networks, such as a Virtual Local Area Network ("VLAN") can be employed to restrict "soft" movements of assets such as software, data, and licenses.

Figure 5:
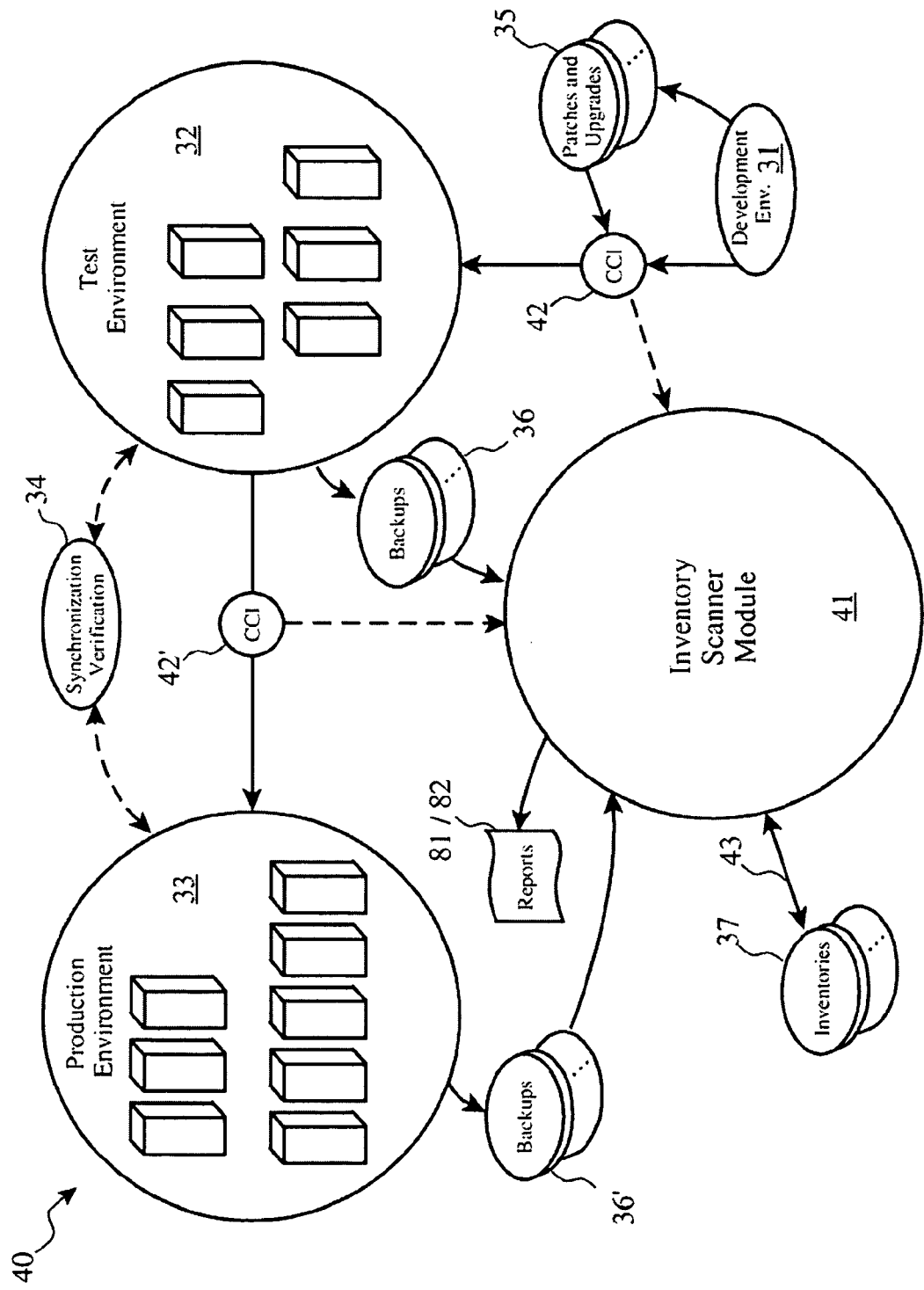
FIG. 5 shows details of two optional functions or embodiment enhancements of the invention.

According to another enhancement of the present invention, the backup copies of each environment can be compared by ISM and verified against the inventories to determine if any discrepancies exist, as shown in FIG. 5. A report (81) can be generated to allow for manual investigation and remedy of the discrepancy, or a signal can be sent to a the appropriate autonomic computing process to effect a correction.

According to yet another enhancement of the present invention, the ISM is adapted to maintain a history of each asset in each inventory, which is then used to produce a report (82) regarding the life of an asset as it was first introduced to a monitored environment, throughout its movements from environment to environment, until its final removal from the monitored environments. This report may be produced in a human-readable format, or may be produced in a computer-readable format for use by other autonomic computing management functions to predict future failures, upgrades, and reliability of assets within an environment. Table 1 provides an example of one embodiment of such a history report.

TABLE 1

Example Asset History Report

Report sorted by asset, most recent to least recent 
asset_class = software-license
asset_identity = IBM_DB2
asset_serial_no = 95BE31X288K2
movement_record: (date=10-15-2004; to_location=production_19; by=RSmith)
movement_record: (date=10-02-2004; to_location=production_18; by=Admin2J)
movement_record: (date=09-22-2004; to_location=test_QA9; by=JeffZ)
movement_record: (date=06-19-2004; to_location=development_BankPlus)
 :                         :                         :

In the example of Table 1, a software license for a database product is tracked from its usage in a development lab for a particular bank, to a test environment, then to a first production environment, following which it is reallocated and moved to a second production environment, perhaps to meet the demands in the second production environment.

Still another advanced aspect of the present invention allows the produced reports to be integrated with the intelligence and functionality of a license management system, such as Tivoli License Manager, or ManageSoft Corporation's "ManageSoft" product. License management is a considerably costly issue for large enterprises, as use of more licenses that have been purchased can amount to a crime (e.g. copyright violation), and underutilization of purchased licenses causes a lower return on the investment in those software licenses. Such license management tools greatly improve a company's ability to manage their license use, through maintaining an accurate inventory of licenses owned, used, and unused. Using a license manager tool, an enterprise can quickly determine if a new license for a particular application program must be purchased to respond to a certain computational requirement, or if an unused license can be allocated to the environment being configured to meet that requirement. As such, the improved inventory reports of the present invention can be provided to a license management system in order to enhance that tool's ability to manage an enterprise's license inventory.

In still another optional aspect of the present invention, physical movements of assets (e.g. movement of hardware from a development lab to a production center) can be tracked from environment to environment as well as logical movements. This is especially useful when the physical locations or areas of assets are aligned with the logical allocation of assets. For example, an enterprise may have a development laboratory corresponding to the development environment, in which computers as well as software are physically located during development activities. These physical assets may be relocated to a test lab during the testing phase, and finally moved to a production center. In accordance with the present invention, these types of inventory changes are made on a per-environment basis upon the detection of a hard asset transition, in this case as detected by sensors such as bar code readers or Radio Frequency Identification ("RFID") tags. Such physical inventory control technologies exist for use in retail and warehouse environments. Integration of their data output from their sensors can be made to the present invention through a number of electronic means, including reception of standardized or proprietary electronic messages containing identification of the assets in transition, their origin environment and their destination environment, and optionally an identification of the administrator performing the physical relocation of the asset, and conversion to the messaging format of our CCI in order to emulate a CCI detection event.

In yet another optional and enhanced embodiment of the present invention, the CCI and ISM are designed to access one or more asset revision level indicators, to compare an inventory associated with a monitored environment to determine if all applicable patches and upgrades have been configured into said environment, and to generate a report detailing any discrepancies between a compared backup and inventory. For example, a monitored production environment may include 4 Pentium V™-based server, such as an IBM eServer™, each running IBM's AIX 5L operating system, and each with a licensed copy of IBM's DB2 Universal Database™. Without revision level checking, this inventory report may seem OK, even though the version of DB2 may be newer that the version of AIX, which requires updates or patches to AIX.

For example, the DB2 revision level may be Version 8.2, but the revision level of AIX may be at Version 5.2, but should be at Version 5.3 in order to patch a problem or support a new feature. To address these version-related issues, which also are known as patch or service pack levels for some products, in an advanced embodiment of the present invention, a set of revision level indicators which establish certain combinations of recommended or "known good" revision levels of software and hardware assets are accessed and compared to the revision level, patch level, or service pack level of each asset for which this characteristic can be determined. The revision level indicators can be contained in a computer database (preferably), but may also be contained entirely or in part in data files of other types. Table 2 provides an example of an inventory report for a particular environment in which revision levels are indicated. This example report is also shown in an alternative format (eXtensible Markup Language style), which is human and computer readable.

TABLE 2

Example Inventory Report

Report sorted by environment 
<environment> production_19
    <asset>
        (asset_class = software-license; asset_identity = IBM_DB2;
        asset_serial_no=95BE31X288K2; revision_lvl=8.2;
        arrived=10-15-2004; by=RSmith)

TABLE 2-continued

Example Inventory Report

```
        </asset>
        <asset>
            (asset_class = software-license; asset_identity =
            AIX_L5;
            asset_serial_no=4BDPW1313GZ9; revision_lvl=5.2;
            arrived=10-13-2004; by=RSmith)
        </asset>
        :                            :              :
</environment>
:                                   :              :
```

It will be recognized by those skilled in the art that the foregoing examples are illustrations of embodiments of the present invention, and they do not define the extent of the invention, whereas the invention may be realized in many forms and in conjunction with a wide array of other products and technologies. For these reasons, the scope of the present invention should be determined by the following claims.

What is claimed is:

1. A system for identification of discrepancies in actual and expected inventories in a physical computing environment having physical asset relocation boundaries comprising:

at least one collector interface disposed in relation with at least two of the physical computing environments such that movement of a physical computing asset from one physical computing environment to another physical computing environment is detected by a physical asset tracking system providing a physical asset relocation output;

at least one asset inventory disposed in a tangible, computer-readable storage memory device, each asset inventory being associated with at least one of the physical computing environments;

at least one backup copy of a physical computing environment disposed in a tangible, computer-readable storage memory device, each backup copy comprising a software image of one or more configured computing systems within the physical computing environment;

an inventory scanner portion of a computer system for establishing an initial asset inventory for each of the physical computing environments, for receiving the physical asset relocation output from the collector interface, for modifying at least one asset inventory responsive to detection of relocation of a physical asset from or into a physical computing environment, and for comparing a backup copy of a physical computing environment with an inventory to detect discrepancies between a compared backup copy and an inventory.

2. The system as set forth in claim 1 wherein the collector interface and the inventory scanner are for cooperating with a self-managed computing system.

3. The system as set forth in claim 2 wherein the collector interface and the inventory scanner are for cooperating with a system selected from the group consisting of an autonomic computing system, an on-demand computing system, a utility computing system, and a grid computing system.

4. The system as set forth in claim 1 wherein the inventory scanner is further for maintaining a history of each asset in each inventory, and for producing a history report regarding the life of an asset as first introduced to a physical computing environment, throughout movements from environment to environment, including final removal from the environments.

5. The system as set forth in claim 1 wherein at least one of the collector interfaces is disposed to monitor asset movement between any two environments selected from the group consisting of one or more development environments, one or more test environments, and one or more production environments.

6. The system as set forth in claim 1 wherein the inventory scanner is further for adding a previously unknown asset to an inventory associated with a physical computing environment in which the previously unknown asset has or will be configured.

7. The system as set forth in claim 1 wherein the inventory scanner is further for removing a previously known asset from an inventory associated with an environment in which the previously known asset was configured.

8. The system as set forth in claim 1 further comprising a license inventory report generator for generating a report containing locations and status of licensed assets, the report being receivable by a license management system.

9. The system as set forth in claim 1 wherein the inventory scanner is for accessing one or more asset revision level indicators, for comparing an inventory associated with a monitored environment to determine if all applicable patches and upgrades have been configured into the environment, and for generating a report detailing any discrepancies between a compared backup and inventory.

10. A method for identification of discrepancies in actual and expected inventories in a physical computing environment having physical asset relocation boundaries comprising:

utilizing in a computer at least one collector interface in relation with at least two physical computing environments such that movement of a physical computing asset from one environment to another environment is detected by a physical asset tracking system providing a physical asset relocation output;

accessing by an inventory scanner computer an initial asset inventory in a tangible, computer-readable storage memory device for each of the physical computing environments and accessing at least one backup copy of a physical computing environment, each backup copy comprising a software image of one or more configured computing systems within a physical computing environment;

receiving by a computer to receiving a physical asset relocation output from the collector interface indicating detection of physical relocation a of a physical asset from one physical computing environment to another physical computing environment, modifying by a computer at least one of the computer asset inventory, the modified inventory being associated with at least one of the physical computing environment to reflect the relocation, and comparing a backup copy of a physical computing environment with an inventory to detect discrepancies between a compared backup copy and an inventory.

11. The method as set forth in claim 10 wherein the collector interface and the inventory scanner cooperate with a self-managed computing system.

12. The method as set forth in claim 11 further comprising wherein the collector interface and the inventory scanner cooperate with a self-managed system selected from the group consisting of an autonomic computing system, an on-demand computing system, a utility computing system, and a grid computing system.

13. The method as set forth in claim 10 further comprising:
maintaining by a computer a history of each asset in each inventory; and
producing by a computer a history report regarding the life of an asset as first introduced to a environment, throughout movements relocations from environment to environment, including final removal from an environment when not currently located in a monitored environment.

14. The method as set forth in claim 10 wherein the disposing of a collector interface comprises disposing a collector interface to monitor asset movement between any two environments selected from the group consisting of one or more development environments, one or more test environments, and one or more production environments.

15. The method as set forth in claim 10 further comprising adding by a computer a previously unknown asset to an inventory associated with an environment in which the previously unknown asset has or will be configured.

16. The method as set forth in claim 10 further comprising removing by a computer a previously known asset from an inventory associated with an environment in which the previously known asset was configured.

17. The method as set forth in claim 10 further comprising generating by a computer a license inventory report containing locations and status of licensed assets, the report being receivable by a license management system.

18. The method as set forth in claim 10 further comprising:
accessing by a computer one or more asset revision level indicators;
comparing by a computer an inventory associated with a monitored environment to determine if all applicable patches and upgrades have been configured into the environment, and
generating by a computer a report detailing any discrepancies between a compared backup and inventory.

19. A computer program product for identification of discrepancies in actual and expected inventories in a physical computing environment having physical asset relocation boundaries comprising:
a tangible, computer readable storage memory device;
an initial asset inventory stored in a tangible, computer-readable storage memory device for each of two or more physical computing environments;
at least one backup copy of a physical computing environment stored in a tangible, computer-readable storage memory device, each backup copy comprising a software image of one or more configured computing systems within a physical computing environment;
first program instructions to receive an event from an physical asset tracking system indicating detection by at least one collector interface in relation with at least two of physical computing environments movement of a physical asset from one physical computing environment to another physical computing environment;
second program instructions to access the initial asset inventory;
third program instructions to modify according to the event an asset inventory associated with at least one of the physical computing environments; and
fourth program instructions for comparing the backup copy of a physical computing environment with an inventory to detect discrepancies between a compared backup copy and an inventory;
wherein the first, second, third and fourth program instructions are stored by the tangible, computer-readable storage memory device.

20. The computer program product as set forth in claim 19 further comprising program instructions stored by the tangible, computer-readable storage memory device to cooperate with a self-managed computing system.

21. The computer program product as set forth in claim 20 further comprising program instructions stored by the tangible, computer-readable storage memory device to cooperate with a system selected from the group consisting of an autonomic computing system, an on-demand computing system, a utility computing system, and a grid computing system.

22. The computer program product as set forth in claim 19 further comprising program instructions stored by the tangible, computer-readable storage memory device to:
maintain a history of each asset in each inventory; and
produce a history report regarding the life of an asset as first introduced to an environment, throughout movements from environment to environment, including final removal from the environments when not currently located in a monitored environment.

23. The computer program product as set forth in claim 19 wherein the collector interface comprises program instructions stored by the tangible, computer-readable storage memory device to monitor physical asset movement between any two environments selected from the group consisting of one or more development environments, one or more test environments, and one or more production environments.

24. The computer program product as set forth in claim 19 further comprising program instructions stored by the tangible, computer-readable storage memory device to add a previously unknown asset to an inventory associated with an environment in which the previously unknown asset has or will be configured.

25. The computer program product as set forth in claim 19 further comprising program instructions stored by the tangible, computer-readable storage memory device to remove a previously known asset from an inventory associated with an environment in which the previously known asset was configured.

26. The computer program product as set forth in claim 19 further comprising program instructions stored by the tangible, computer-readable storage memory device to generate a license inventory report containing locations and status of licensed assets, the report being receivable by a license management system.

27. The computer program product as set forth in claim 19 further comprising program instructions stored by the tangible, computer-readable storage memory device to:
access one or more asset revision level indicators;
compare an inventory associated with a monitored environment to determine if all applicable patches and upgrades have been configured into the environment; and
generate a report detailing any discrepancies between a compared backup and inventory.

* * * * *